(12) United States Patent
Wantland et al.

(10) Patent No.: US 12,449,189 B2
(45) Date of Patent: Oct. 21, 2025

(54) HANDLE ASSEMBLY FOR AN APPLIANCE DOOR

(71) Applicant: Haier US Appliance Solutions, Inc., Wilmington, DE (US)

(72) Inventors: Louis A. Wantland, Louisville, KY (US); William Jeremy Leachman, Pewee Valley, KY (US); Jonathan Charles Crosby, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 0 days.

(21) Appl. No.: 18/620,124

(22) Filed: Mar. 28, 2024

(65) Prior Publication Data

US 2025/0305755 A1    Oct. 2, 2025

(51) Int. Cl.
F25D 23/02    (2006.01)
E05B 1/00    (2006.01)

(52) U.S. Cl.
CPC .......... *F25D 23/028* (2013.01); *E05B 1/0015* (2013.01)

(58) Field of Classification Search
CPC ....... F25D 23/08; F25D 23/028; E05B 1/0015
USPC .................... 16/415, 412, 426, 422
See application file for complete search history.

(56) References Cited

U.S. PATENT DOCUMENTS

| | | | |
|---|---|---|---|
| 3,995,349 A * | 12/1976 | Roberts | A47B 95/02 16/412 |
| 4,127,353 A * | 11/1978 | Busse | F16B 12/2054 403/245 |
| 4,912,809 A * | 4/1990 | Scheuer | F16B 9/058 16/443 |
| 5,797,164 A * | 8/1998 | Donaghy | A47B 95/02 403/381 |
| 6,430,780 B1 * | 8/2002 | Kim | F25D 23/028 16/412 |
| 7,992,257 B2 | 8/2011 | Kim | |
| 8,506,027 B2 * | 8/2013 | Klaus | E05B 1/0015 312/405 |
| 8,813,995 B2 | 8/2014 | Kim et al. | |
| 9,009,969 B2 | 4/2015 | Choi et al. | |
| 9,297,182 B2 | 3/2016 | Moody et al. | |
| 11,300,351 B2 | 4/2022 | Pendyala | |
| 11,656,023 B2 | 5/2023 | Pendyala | |

(Continued)

FOREIGN PATENT DOCUMENTS

| | | |
|---|---|---|
| CN | 201177425 Y | 1/2009 |
| CN | 103727732 A | 4/2014 |

(Continued)

*Primary Examiner* — Emily M Morgan
(74) *Attorney, Agent, or Firm* — Dority & Manning, P.A.

(57) ABSTRACT

A door assembly for an appliance includes a door defining an outer door panel, a mounting stud extending from the outer door panel, and a handle assembly. The handle assembly includes a handle tube, a bushing seated against the handle tube and defining a through hole, a bushing fastener passing through the through hole of the bushing and engaging the handle tube, wherein the bushing fastener is undersized relative to the through hole to provide mechanical play between the bushing and the handle tube, an end cap positioned between an outer door panel and the handle tube, and a set screw passing through a set screw aperture defined in the bushing to engage the mounting stud and secure the bushing to the outer door panel.

20 Claims, 5 Drawing Sheets

(56) References Cited

U.S. PATENT DOCUMENTS

| | | | |
|---|---|---|---|
| 11,940,155 B1* | 3/2024 | Nagane | F25D 23/028 |
| 2005/0060844 A1* | 3/2005 | Chiang | E05B 1/0015 |
| | | | 16/412 |
| 2009/0007385 A1* | 1/2009 | Kim | F25D 23/028 |
| | | | 16/412 |
| 2010/0005631 A1* | 1/2010 | Drach | E05B 1/0015 |
| | | | 16/436 |
| 2012/0074826 A1* | 3/2012 | Klaus | A47B 95/02 |
| | | | 312/405 |
| 2016/0084567 A1* | 3/2016 | Fernandez | F25D 23/028 |
| | | | 312/405 |
| 2020/0217515 A1 | 7/2020 | Wantland et al. | |
| 2025/0093090 A1* | 3/2025 | Okruch | E05B 1/0015 |

FOREIGN PATENT DOCUMENTS

| | | |
|---|---|---|
| CN | 215412662 U | 1/2022 |
| KR | 100781634 B1 | 12/2007 |

* cited by examiner

HANDLE ASSEMBLY FOR AN APPLIANCE DOOR

FIELD OF THE INVENTION

The present subject matter relates generally to domestic appliances, and more particularly, to handle assemblies for domestic appliances.

BACKGROUND OF THE INVENTION

Domestic appliances (e.g., refrigerators, ovens, microwaves, etc.) typically include doors to open and close certain receiving spaces or drawers. For example, a user may open and close the doors or drawer to facilitate selective access to the interior storage space and easy storage of items. These doors (or drawers) include handles attached thereto which can be grasped and pulled by a user to gain access to the receiving space via the door or drawer. The handles include connection points at which the handle is connected to the appliance (e.g., the door or drawer).

However, with some current handle assemblies, handle endcaps are exposed to various cleaning and food elements that may result in environmental stress cracking. This cracking can lead to failure of the plastic end cap and poor performance of the handle from the appliance. Other designs could use an endcap manufactured from a material that is not subject to environmental stress cracking, such as metal. However, this would be significantly more expensive. In addition, conventional mounting methods include no way to ensure proper installation of the handle.

Accordingly, a handle assembly that provides features for improved installation and durability is desirable. More specifically, a handle that includes a construction that minimizes the potential for environmental stress cracking, e.g., to plastic endcaps, would be particularly beneficial.

BRIEF DESCRIPTION OF THE INVENTION

Aspects and advantages of the invention will be set forth in part in the following description, may be apparent from the description, or may be learned through practice of the invention.

In one exemplary embodiment, a handle assembly for an appliance is provided including a handle tube, a bushing seated against the handle tube and defining a through hole, a bushing fastener passing through the through hole of the bushing and engaging the handle tube, wherein the bushing fastener is undersized relative to the through hole to provide mechanical play between the bushing and the handle tube, and an end cap positioned between an outer door panel and the handle tube.

In another exemplary embodiment, a door assembly for an appliance is provided including a door defining an outer door panel, a mounting stud extending from the outer door panel, and a handle assembly comprising a handle tube, a bushing seated against the handle tube and defining a through hole, a bushing fastener passing through the through hole of the bushing and engaging the handle tube, wherein the bushing fastener is undersized relative to the through hole to provide mechanical play between the bushing and the handle tube, an end cap positioned between an outer door panel and the handle tube, and a set screw passing through a set screw aperture defined in the bushing to engage the mounting stud and secure the bushing to the outer door panel.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "upstream" and "downstream" refer to the relative flow direction with respect to fluid flow in a fluid pathway. For example, "upstream" refers to the flow direction from which the fluid flows, and "downstream" refers to the flow direction to which the fluid flows. The terms "includes" and "including" are intended to be inclusive in a manner similar to the term "comprising." Similarly, the term "or" is generally intended to be inclusive (i.e., "A or B" is intended to mean "A or B or both").

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. For example, the approximating language may refer to being within a 10 percent margin.

Figure 1:
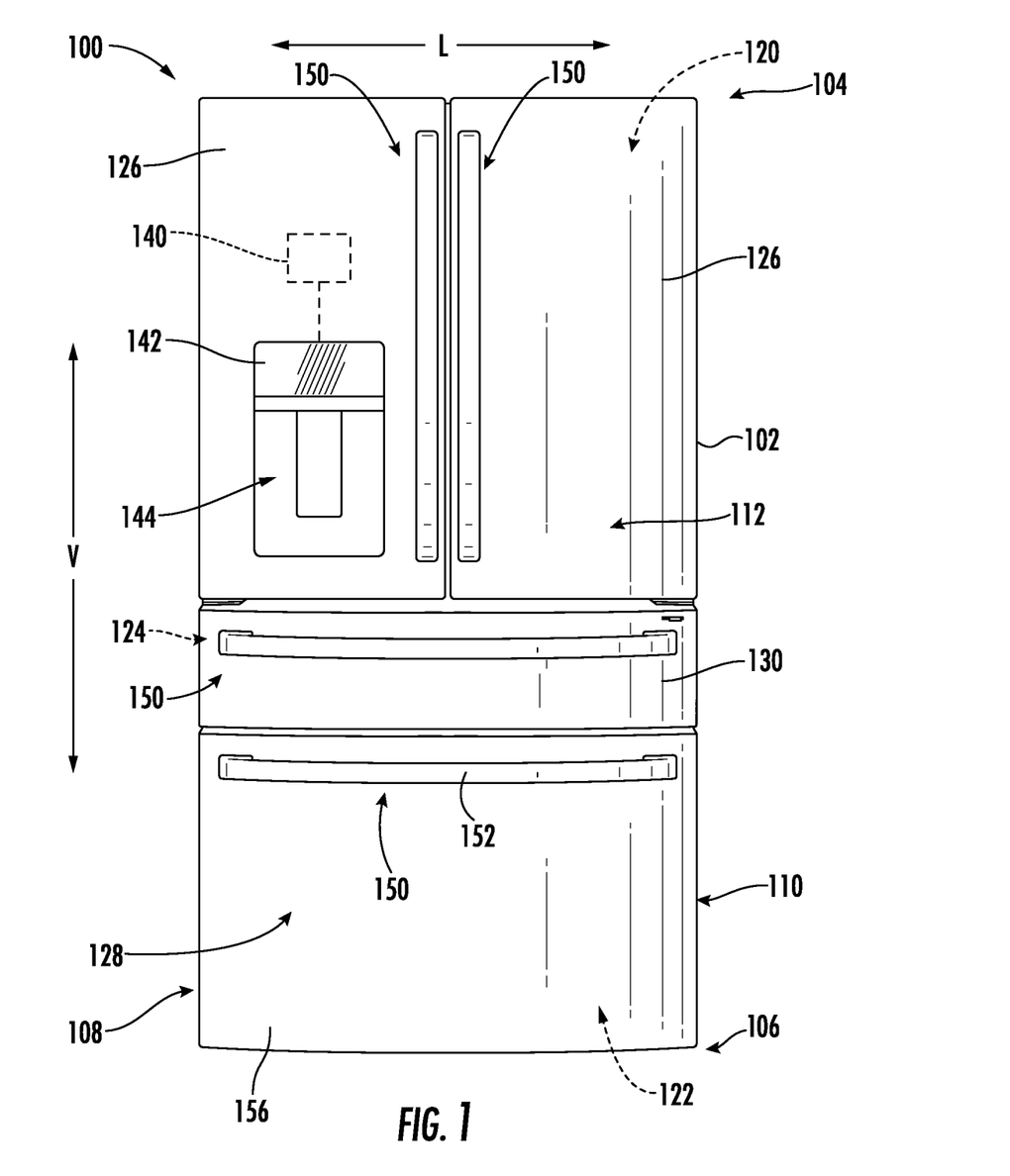
FIG. 1 provides a front view of a refrigerator appliance according to an example embodiment of the present disclosure.
Figure 2:
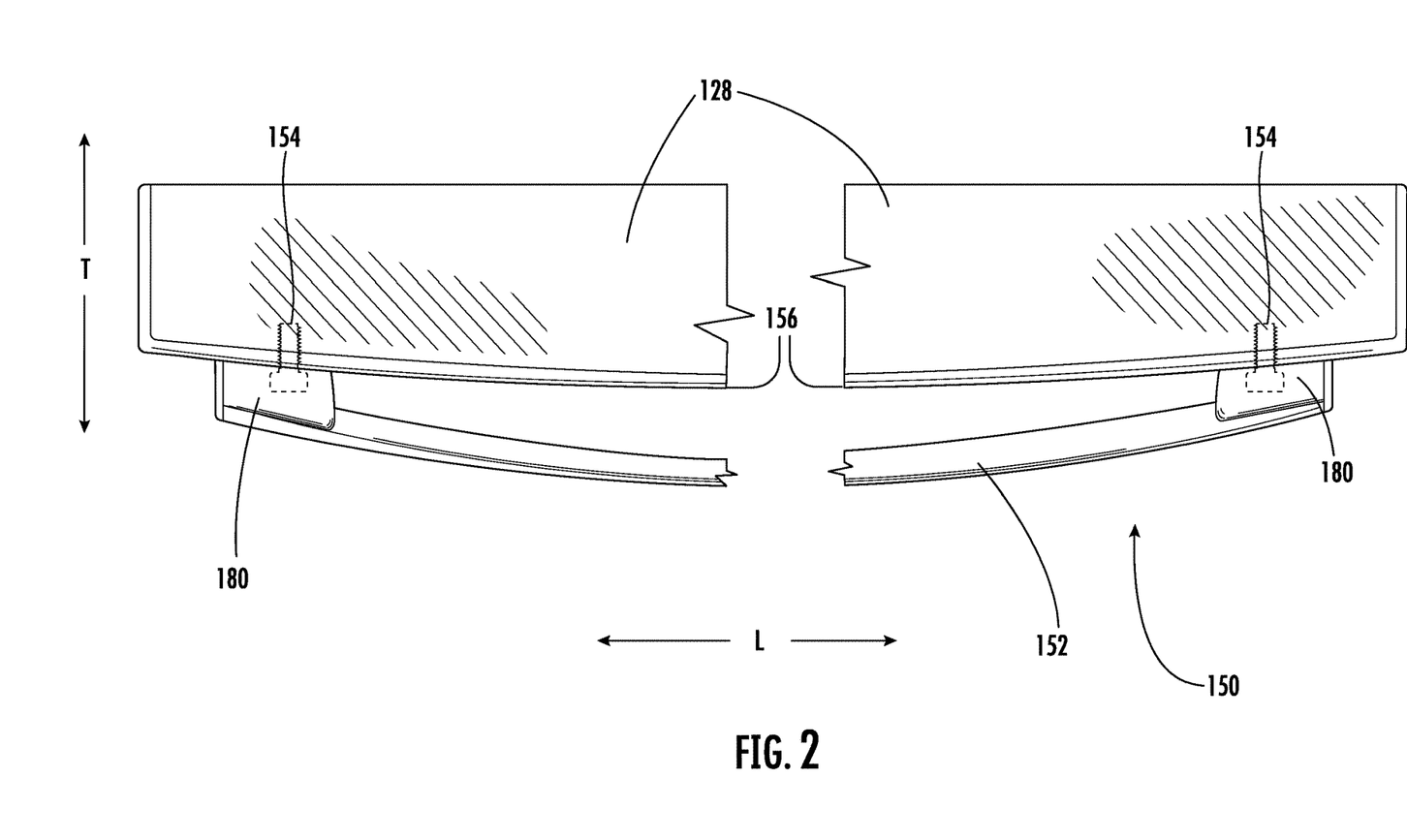
FIG. 2 provides a plan view of a handle assembly of the example refrigerator appliance of FIG. 1 according to an example embodiment of the present disclosure.

FIG. 1 provides a perspective view of a refrigerator appliance 100 according to an exemplary embodiment of the present subject matter. Refrigerator appliance 100 includes a housing or cabinet 102 that extends between a top 104 and a bottom 106 along a vertical direction V, between a first side 108 and a second side 110 along a lateral direction L, and between a front side 112 and a rear side (not shown) along a transverse direction T. Each of the vertical direction V, lateral direction L, and transverse direction T are mutually perpendicular to one another and form an orthogonal direction system.

Cabinet 102 defines chilled chambers for receipt of food items for storage. In particular, cabinet 102 defines fresh food chamber 120 positioned at or adjacent top 104 of cabinet 102 and a freezer chamber 122 arranged at or adjacent bottom 106 of cabinet 102. An auxiliary food storage chamber 124 may be positioned between the fresh food storage chamber 120 and the freezer chamber 122, e.g., along the vertical direction V. As such, refrigerator appliance 100 is generally referred to as a bottom mount refrigerator. It is recognized, however, that the benefits of the present disclosure apply to other types and styles of refrigerator appliances such as, e.g., a top mount refrigerator appliance, a side-by-side style refrigerator appliance, or a single door refrigerator appliance. Moreover, aspects of the present subject matter may be applicable to any suitable appliance including a handle. Consequently, the description set forth herein is for illustrative purposes only and is not intended to be limiting in any aspect to any particular appliance or configuration.

Refrigerator doors 126 are rotatably hinged to an edge of cabinet 102 for selectively accessing fresh food chamber 120. In addition, a freezer door 128 and an auxiliary door 130 are arranged below refrigerator doors 126 for selectively accessing freezer chamber 122. Freezer door 128 is coupled to a freezer drawer (not shown) slidably mounted within freezer chamber 122. To prevent leakage of cool air, refrigerator doors 126, freezer door 128, auxiliary door 130, and/or cabinet 102 may define one or more sealing mechanisms (e.g., rubber gaskets, not shown) at the interface where the doors 126, 128, 130 meet cabinet 102. It should be appreciated that doors having a different style, position, or configuration are possible within the scope of the present subject matter.

In the exemplary embodiment, cabinet 102 may also define a mechanical compartment (not shown) for receipt of a sealed cooling system (not shown). In general, the sealed cooling system is configured for transporting heat from the inside of refrigerator appliance 100 to the outside (e.g., by executing a vapor-compression cycle or another suitable refrigeration cycle). As is generally understood by those of skill in the art, the hermetically sealed system contains a working fluid, e.g., refrigerant, which flows between various heat exchangers of the sealed system where the working fluid changes phases while transferring thermal energy. Further details regarding the operation of the sealed system are omitted here for brevity.

Operation of the refrigerator appliance 100 can be regulated by a controller 140 that is operatively coupled to a user interface panel 142. User interface panel 142 may provide selections for user manipulation of the operation of refrigerator appliance 100 to modify environmental conditions therein, such as temperature selections, etc. In some embodiments, user interface panel 142 may be proximate a dispenser assembly 144. In response to user manipulation of the user interface panel 142, the controller 140 may operate various components of the refrigerator appliance 100. The controller 140 may regulate operation of various components of the refrigerator appliance 100 in response to programming and/or user manipulation of the user interface panel 142.

The controller 140 may include a memory and one or more microprocessors, CPUs or the like, such as general or special purpose microprocessors operable to execute programming instructions or micro-control code associated with operation of refrigerator appliance 100. The memory may represent random access memory such as DRAM, or read only memory such as ROM or FLASH. In one embodiment, the processor executes programming instructions stored in memory. The memory may be a separate component from the processor or may be included onboard within the processor. It should be noted that controller 140 as disclosed herein is capable of and may be operable to perform any methods and associated method steps as disclosed herein.

The controller 140 may be positioned in a variety of locations throughout refrigerator appliance 100. In the illustrated embodiment, the controller 140 is located within the door 126. In such an embodiment, input/output ("I/O") signals may be routed between the controller and various operational components of refrigerator appliance 100. In one embodiment, the user interface panel 142 represents a general purpose I/O ("GPIO") device or functional block. In one embodiment, the user interface 142 includes input components, such as one or more of a variety of electrical, mechanical or electro-mechanical input devices including rotary dials, push buttons, and touch pads. The user interface 142 may include a display component, such as a digital or analog display device designed to provide operational feedback to a user. For example, the user interface 142 may include a touchscreen providing both input and display functionality. The user interface 142 may be in communication with the controller via one or more signal lines or shared communication busses.

Referring now generally to FIGS. 1 through 7, refrigerator appliance 100 may include one or more handle assemblies 150. For example, a first handle assembly 150 may be attached to freezer door 128, a second handle assembly 150 may be attached to auxiliary door 130, and third and fourth handle assemblies 150 may be attached to refrigerator doors 126. Hereinafter, a single handle assembly 150 will be described in detail in reference to attachment to freezer door 128. It should be understood that the description for handle assembly 150 may apply to one or more handles used to open or close any of the doors or drawers on a domestic appliance (e.g., refrigerator appliance 100).

Figure 4:
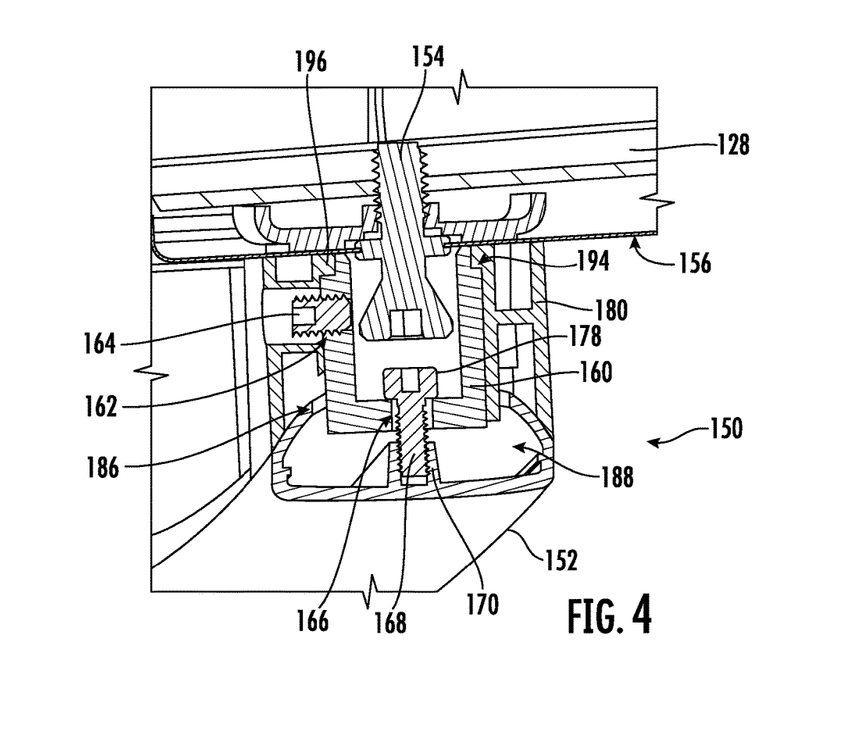
FIG. 4 provides a side, cross-sectional view of the example handle assembly of FIG. 2 according to an example embodiment of the present disclosure.
Figure 5:
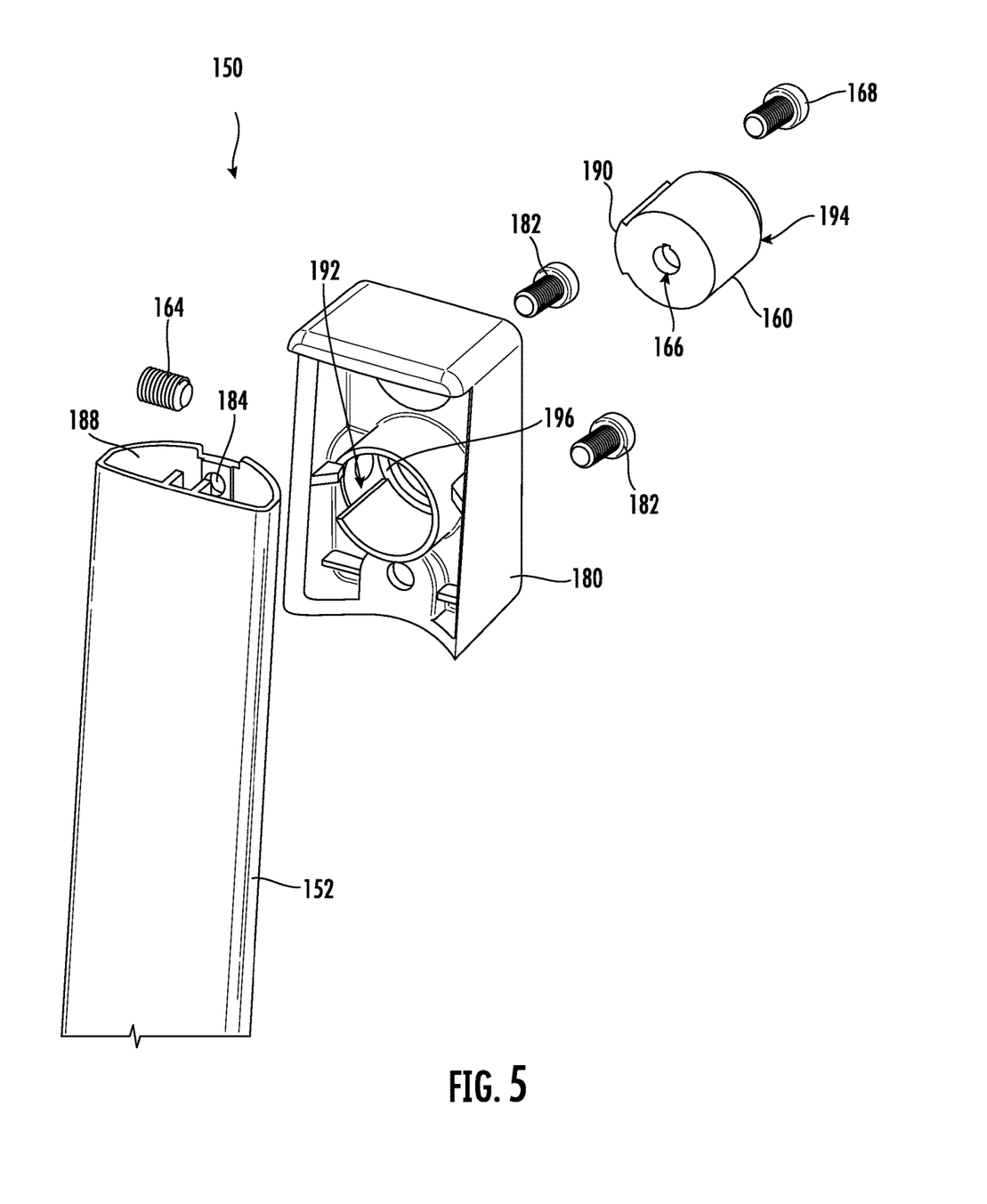
FIG. 5 provides an exploded view of the example handle assembly of FIG. 2 according to an example embodiment of the present disclosure.
Figure 6:
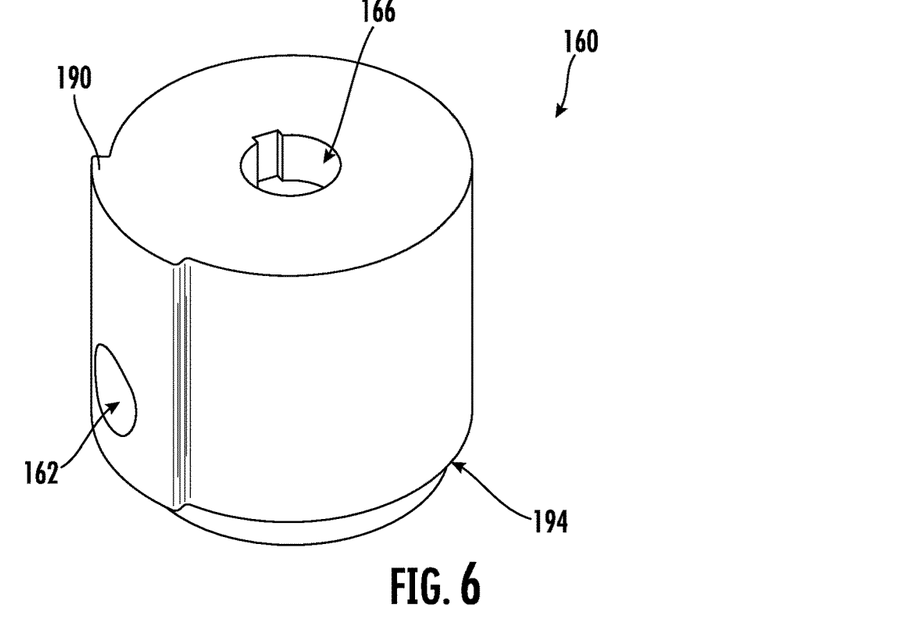
FIG. 6 provides a perspective view of a bushing of the example handle assembly of FIG. 2 according to an example embodiment of the present disclosure.
Figure 7:
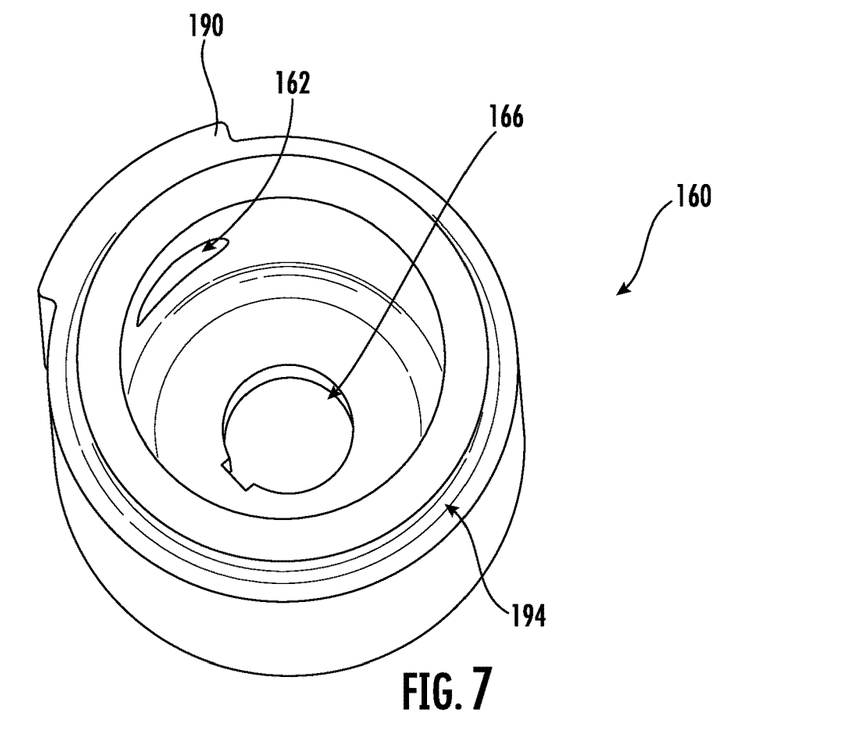
FIG. 7 provides another perspective view of the example bushing of FIG. 6 according to an example embodiment of the present disclosure.

For instance, with respect to freezer door 128, handle assembly 150 may include a handle tube 152 that is generally oriented in the horizontal position, i.e., parallel to the lateral L direction. In general, handle tube 152 may be a relatively long, slender, generally hollow, tube that is used by a user to grasp handle assembly 150 and manipulate the position of freezer door 128. In this regard, when installed, handle tube 152 may be spaced apart from freezer door 128 such that a user may grasp handle tube 152 to pull open freezer door 128. In the illustrated embodiment, handle tube 152 has a closed, generally trapezoidal cross section (FIGS. 4 and 5). According to some embodiments, handle tube 152 may be cylindrical in cross section, while in others, other closed, generally hollow cross section may be used. According to the illustrated exemplary embodiment, handle tube 152 may be curved.

According to the illustrated embodiment, refrigerator appliance 100 may include one or more mounting studs 154 to which handle tube 152 may be attached to freezer door 128. More specifically, mounting studs 154 may be embedded within or otherwise secured to freezer door 128 and may extend from an outer door panel 156 forward along the transverse direction T. As illustrated, mounting studs 154 may generally define an axial direction A and a radial direction R that extends perpendicular to the axial direction A. As described in more detail below, handle assembly 150 may include various features for facilitating attachment of handle tube 152 to mounting studs 154. One of ordinary skill in the art will recognize that the same or substantially similar attachment components may be useful in attaching a handle assembly 150 in different orientations, for example in the vertical V direction (for example, as oriented on refrigerator doors 126).

As shown for example in FIGS. 3 through 7, handle assembly 150 may include a bushing 160 that is seated against handle tube 152 and outer door panel 156. According to example embodiments, bushing 160 may define a threaded aperture 162 (e.g., a set screw aperture) that is configured for receiving a threaded fastener 164 (e.g., such as a set screw). To install handle assembly 150, a user may insert threaded fastener 164 into threaded aperture 162 until it engages mounting studs 154 to create a firm engagement and secure handle assembly 150 to freezer door 128. It should be appreciated that other attachment methods and fasteners may be used while remaining within the scope of the present subject matter.

According to the illustrated embodiment, bushing 160 may further define a through hole 166 that is configured for receiving a bushing fastener 168. Bushing fastener 168 may extend through the through hole 166 and may engage handle tube 152. More specifically, handle tube 152 may define a boss 170 for securely receiving bushing fastener 168 (e.g., via threaded engagement). According to the illustrated embodiment, bushing fastener 168 may be undersized relative to through hole 166 to provide some mechanical play between bushing 160 and handle tube 152. In this regard, an outer diameter 172 of bushing fastener 168 may be smaller than an internal diameter 174 of through hole 166. In addition, or alternatively, bushing fastener 168 may define a fastener length 176 that is long enough to engage boss 170 without a fastener head 178 being fully seated against bushing 160. In this manner, bushing fastener 168 may permit relative movement between bushing 160 and handle tube 152 when bushing fastener 168 is fully installed. It should be appreciated that other methods for achieving mechanical play between bushing 160 and handle tube 152 are possible and within the scope of the present subject matter.

Figure 3:
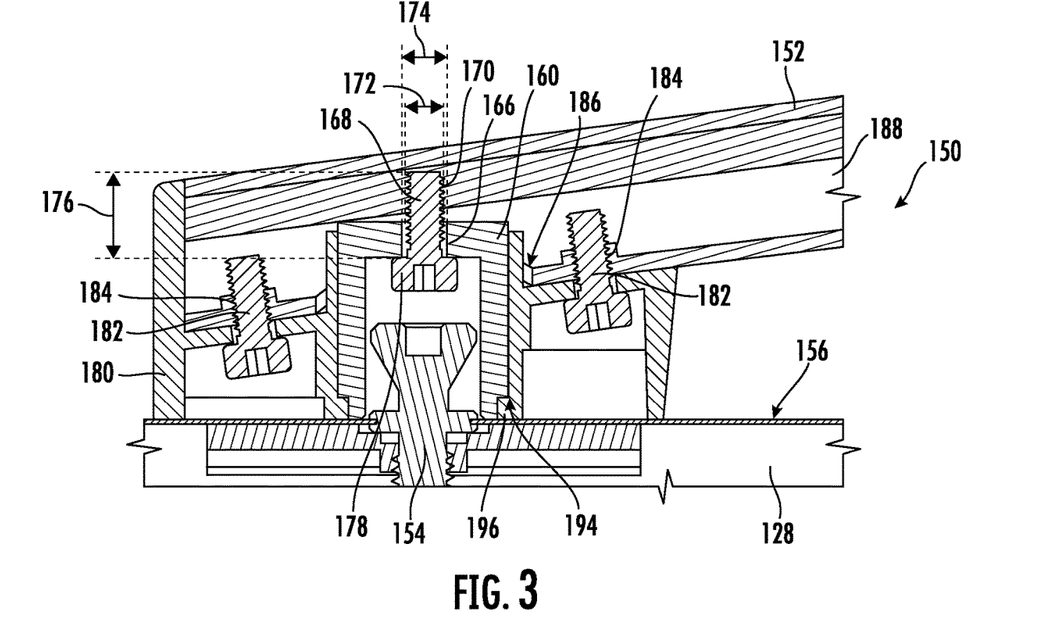
FIG. 3 provides a top, cross-sectional view of the example handle assembly of FIG. 2 according to an example embodiment of the present disclosure.

Referring now specifically to FIGS. 3 through 5, handle assembly 150 may further include one or more end caps 180 that are generally positioned between outer door panel 156 and handle tube 152. In this manner, end caps 180 may be used to firmly secure handle tube 152 to freezer door 128. In addition, end caps 180 may be configured to conceal or cap the ends of handle tube 152. As shown, one or more cap screws 182 may pass through end caps 180 and may be received within one or more threaded bosses 184 defined in handle tube 152. In this manner, by passing cap screws 182 through end caps 180 and securing them to handle tube 152, the mechanical play between handle tube 152, bushing 160, and freezer door 128 may be eliminated. According to the illustrated embodiment, two cap screws 182 are positioned on opposite sides of bushing 160 for securing end caps 180, though any other suitable number of screws or fasteners may be used according to alternative embodiments.

In general, handle tube 152, bushing 160, end caps 180, and other components of handle assembly 150 may be formed from any suitably rigid material. For example, handle tube 152 and bushing 160 may be formed from a metal material and end caps 180 may be formed from any suitable plastic material. For example, end caps 180 may be formed by injection molding, e.g., using a suitable plastic material, such as injection molding grade Polybutylene Terephthalate (PBT), Nylon 6, high impact polystyrene (HIPS), acrylonitrile butadiene styrene (ABS), or any other suitable blend of polymers. Alternatively, according to the exemplary embodiment, these components may be compression molded, e.g., using sheet molding compound (SMC) thermoset plastic or other thermoplastics.

According to example embodiments, handle tube 152, bushing 160, and end caps 180 may define any suitable features for facilitating engagement between these components and securing handle assembly 150 to freezer door 128. For example, handle tube 152 may define an alignment aperture 186 that is configured for at least partially receiving bushing 160 and end cap 180 into a hollow portion 188 of handle tube 152. For example, an alignment flange 190 may protrude from bushing 160 along the radial direction R and may be received within an alignment recess 192 defined in end cap 180, e.g., thereby obtaining proper angular alignment between these two components. In addition, bushing 160 may define a circumferential groove 194 at one end which is received within a shoulder 196 of end cap 180. According to example embodiments, these features may ensure firm engagement and seating of handle tube 152, bushing 160, end caps 180, and outer door panel 156, e.g., such that bushing 160 and end cap 180 are seated against outer door panel 156 in the installed position.

Notably, the features of handle assembly 150 described herein may ensure proper mounting of handle assembly 150 to freezer door 128. In addition, these features may ensure that a failure of end caps 180 does not result in the loss of function of handle assembly 150. More specifically, the plastic end caps 180 may be particularly susceptible to chemical attack and corrosion, e.g., due to harsh cleaning products. In the event of an end cap 180 failure, threaded fastener 164 may prevent handle tube 152 from losing all function. In addition, due to the mechanical play between bushing 160 and handle tube 152, a user may become aware of an issue with handle assembly 150 and may take corrective action before handle assembly 150 loses all function (e.g., by ordering a new handle, scheduling a maintenance visit, etc.).

As explained herein, aspects of the present subject matter are generally directed to an appliance handle, e.g., such as a refrigerator handle, that includes a bushing and a set screw type attachment (a robust fastener). The bushing may be mechanically restrained/attached directly to the handle tube/ body through a robust fastener or fastening method (set screw type attachment), e.g., a fastener that is not susceptible to chemical attack (thereby eliminating this failure mechanism). An intentional design clearance may be provided between the bushing and the fastener to prevent assembly over-constraining.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A handle assembly for an appliance, comprising:
    the appliance comprising an outer door panel;
    a handle tube;
    a bushing seated against the handle tube and defining a through hole;
    a bushing fastener passing through the through hole of the bushing and engaging the handle tube, wherein the bushing fastener is undersized relative to the through hole to provide mechanical play between the bushing and the handle tube;
    an end cap positioned between the outer door panel and the handle tube; and
    one or more cap screws securely attaching the end cap to the handle tube.

2. The handle assembly of claim 1, wherein the bushing fastener is received within a boss defined on the handle tube.

3. The handle assembly of claim 1, wherein the handle tube defines one or more threaded bosses for receiving the one or more cap screws.

4. The handle assembly of claim 1, wherein the one or more cap screws comprise two cap screws positioned on opposite side of the bushing.

5. The handle assembly of claim 1, wherein the handle tube defines an alignment aperture for at least partially receiving the bushing and the end cap into a hollow portion of the handle tube.

6. The handle assembly of claim 1, wherein the bushing and the end cap are seated against a front surface of the outer door panel.

7. The handle assembly of claim 1, further comprising:
    a mounting stud extending from the outer door panel; and
    a set screw passing through a set screw aperture defined in the bushing to engage the mounting stud and secure the bushing to the outer door panel.

8. The handle assembly of claim 1, further comprising:
    an alignment flange protruding from the bushing for receipt within an alignment recess defined in the end cap.

9. The handle assembly of claim 1, wherein the bushing defines circumferential groove at one end received within a shoulder of the end cap.

10. The handle assembly of claim 1, wherein the end cap is formed from a plastic material.

11. The handle assembly of claim 1, wherein the bushing is formed from a metal material.

12. The handle assembly of claim 1, wherein the appliance is a refrigerator appliance.

13. A door assembly for an appliance, the door assembly comprising:
    a door defining an outer door panel;
    a mounting stud extending from the outer door panel; and
    a handle assembly comprising:
        a handle tube;
        a bushing seated against the handle tube and defining a through hole;
        a bushing fastener passing through the through hole of the bushing and engaging the handle tube, wherein the bushing fastener is undersized relative to the through hole to provide mechanical play between the bushing and the handle tube;
        an end cap positioned between an outer door panel and the handle tube;
        a set screw passing through a set screw aperture defined in the bushing to engage the mounting stud and secure the bushing to the outer door panel;
        an alignment flange protruding from the bushing for receipt within an alignment recess defined in the end cap; and
        a circumferential groove defined at one end of the bushing and being configured for receipt within a shoulder of the end cap.

14. The door assembly of claim 13, wherein the bushing fastener is received within a boss defined on the handle tube.

15. The door assembly of claim 13, further comprising:
    one or more cap screws securely attaching the end cap to the handle tube.

16. The door assembly of claim 15, wherein the handle tube defines one or more threaded bosses for receiving the one or more cap screws, wherein the one or more cap screws comprise two cap screws positioned on opposite side of the bushing.

17. The door assembly of claim 13, wherein the handle tube defines an alignment aperture for at least partially receiving the bushing and the end cap into a hollow portion of the handle tube.

18. The door assembly of claim 13, wherein the end cap is formed from a plastic material and the bushing is formed from a metal material.

19. A handle assembly for an appliance, comprising:
    the appliance comprising an outer door panel;
    a handle tube;
    a bushing seated against the handle tube and defining a through hole;
    a bushing fastener passing through the through hole of the bushing and engaging the handle tube, wherein the bushing fastener is undersized relative to the through hole to provide mechanical play between the bushing and the handle tube;
    an end cap positioned between the outer door panel and the handle tube;
    a mounting stud extending from the outer door panel; and
    a set screw passing through a set screw aperture defined in the bushing to engage the mounting stud and secure the bushing to the outer door panel.

20. The handle assembly of claim 19, further comprising:
    one or more cap screws securely attaching the end cap to the handle tube.

* * * * *